United States Patent [19]

Good

[11] 3,838,587

[45] Oct. 1, 1974

[54] AUTOMOBILE THEFT PROTECTOR

[75] Inventor: Gene P. Good, Olyphant, Pa.

[73] Assignee: The Raymond Lee Organization, Inc., New York, N.Y.

[22] Filed: Mar. 13, 1973

[21] Appl. No.: 340,734

[52] U.S. Cl................ 70/243, 137/353, 137/384.8, 251/219, 251/294
[51] Int. Cl. ....................... B60r 25/04, F16k 35/06
[58] Field of Search...... 70/242, 243; 137/353, 384, 137/384.2, 384.6, 384.8; 251/219, 294

[56] References Cited
UNITED STATES PATENTS

| | | | |
|---|---|---|---|
| 1,062,154 | 5/1913 | Harnly | 70/242 |
| 1,345,672 | 7/1920 | Henckler | 70/243 |
| 1,374,621 | 4/1921 | Wicker | 137/384.8 |
| 1,537,411 | 5/1925 | Cox et al. | 137/384.2 |
| 2,006,027 | 6/1935 | Moore | 137/384.2 |

Primary Examiner—Albert G. Craig, Jr.
Attorney, Agent, or Firm—Howard I. Podell

[57] ABSTRACT

A device for preventing the theft of a locked automobile comprising a valve in the gasoline line leading to the carburetor which is operated by the keyed ignition lock. Rotation of the tumblers of the ignition lock by the key, serves to rotate a valve member, with the valve member acting to close the line leading from the gasoline tank to the carburetor when the ignition lock is in the locked position, and the valve being in the open mode when the ignition lock is in the unlocked position.

1 Claim, 2 Drawing Figures

AUTOMOBILE THEFT PROTECTOR

SUMMARY OF THE INVENTION

This invention relates to a means of preventing the theft of a locked automobile, and particularly to a device which shuts the gasoline line leading to the carburetor, when the ignition lock is in the locked position.

The advantage of this invention is that the common method employed by automobile thieves of by-passing the ignition lock electrically, in "jumping" the ignition lock, would not be sufficient to operate the engine of a stolen car, thus equipped. Furthermore, a car equipped with the invention would probably serve to entrap a thief, since the engine would start initially from the fuel remaining in the carburetor, but would stall within minutes once the car was driven on the street. The thief would probably be noticed in the act of abandoning a stalled automobile in traffic and would incur the likelihood of being arrested in the act of abandoning such a stalled automobile.

The device comprises a valve in the fuel line leading from the fuel tank to the carburetor which may be mounted on the engine side of the firewall. The valve member rotates to the open and the closed positions, and is mechanically linked with the rotatable operator member of the ignition lock. Rotation of the operator member of the ignition lock, by means of the inserted ignition lock key, serves to open or close the gasoline line valve.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
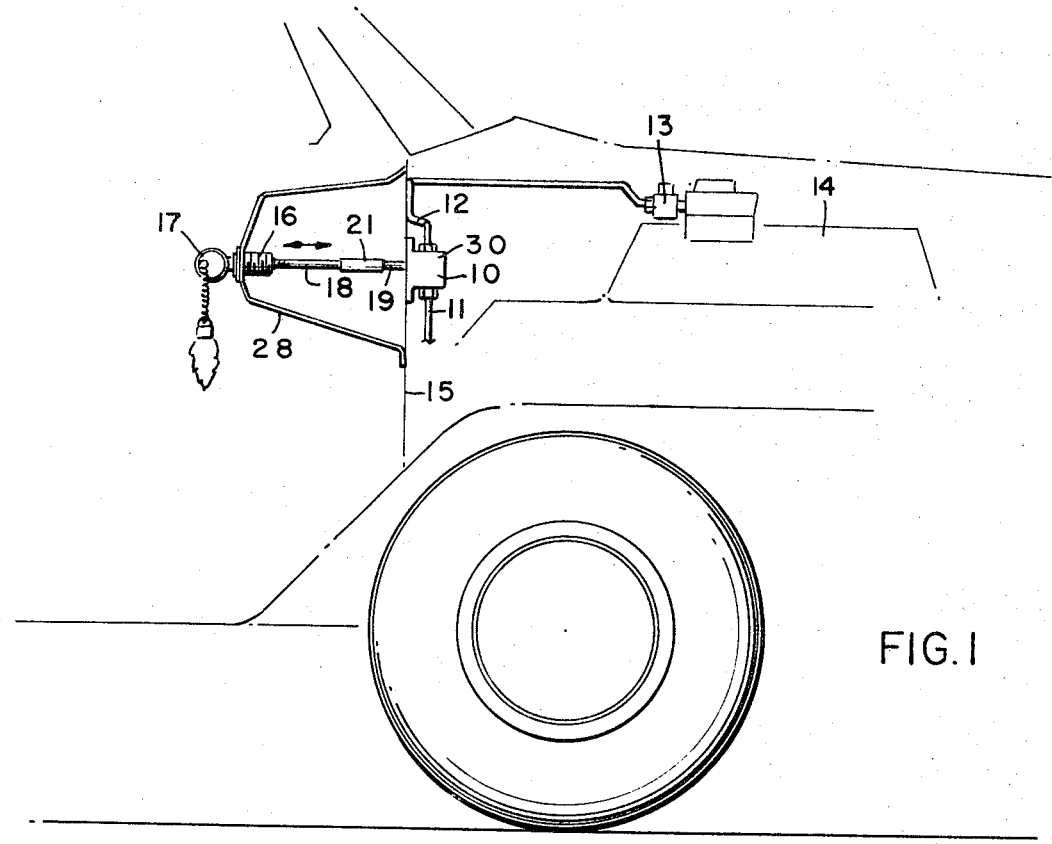
FIG. 1 is a sectional view, in elevation of the installation of the device on an automobile.
Figure 2:
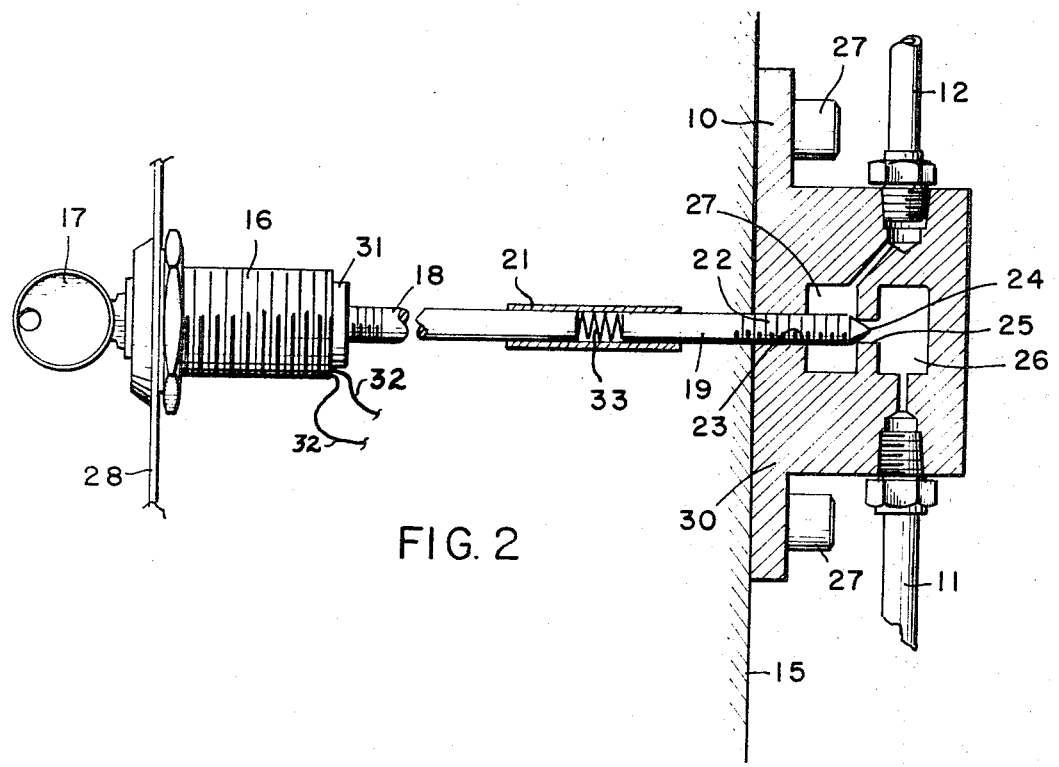
FIG. 2 is a sectional view of the device.

Turning now descriptively to the drawings, in which similar reference characters denote similar elements throughout the several views, FIGS. 1–2 illustrate the device 10 which comprises a valve 30 inserted between the fuel line 11 leading from the gasoline tank and the fuel line 12 leading to the carburetor 13 of automobile engine 14. The valve 30 is mounted on the engine side of the firewall 15 by means of bolts 27.

The ignition lock 16 which is operated by key 17 is enclosed in dash housing 28, and the rotatable tumbler member 31 of the lock 16 is joined to an extension shaft 18 which is fastened by compression spring 33 in coupler 21 in rotatable engagement with valve shaft 19. Valve shaft 19 is formed with a male thread 22 which engages female thread 23 of the housing of valve 30, with shaft 19 coming to a pointed valve end 24. Valve end 24 seats, in the closed position, in valve orifice 25 closing the opening between input valve chamber 26 and output valve chamber 27 which lead respectively to the incoming fuel line 11 and the carburetor fuel line 12.

Rotation of the lock tumber member 31 by operation of key 17 serves to both connect or disconnect the electrical ignition circuit of the automobile connected to the ignition lock 16 in conventional manner by ignition circuit wires 32, and to open or close the fuel supply to the carburetor 13.

For conventional ignition locks which open when the key is rotated in the clockwise position, mating threads 22 and 23 of the valve shaft 19 and valve housing may be of the left hand configuration.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the U.S. is:

1. An automobile theft protection device which serves to disconnect the fuel supply leading to the carburetor of the automobile engine when the ignition lock is in the locked position comprising
   a valve which is located in the fuel line leading to the carburetor from the gasoline tank, with the operating arm of the valve joined mechanically to the rotatable tumbler member of the conventional ignition lock of the automobile, said operating arm of the valve formed with a male threaded section which mates with a female threaded section of the housing of the valve, such that the valve member moves in an axial direction to open or to close the valve when the valve member is rotated by the rotation of the tumbler member of the ignition lock, in which the valve operating arm is joined in rotatable engagement with a shaft joined to the tumbler member of the ignition lock by a compression spring which permits axial motion of the valve member with respect to the shaft joined to the tumbler member, when the valve member is rotated in threaded engagement with the valve housing.

* * * * *